(12) United States Patent
Huang et al.

(10) Patent No.: US 8,723,817 B2
(45) Date of Patent: May 13, 2014

(54) TOUCH-SENSING STRUCTURE FOR TOUCH PANEL AND TOUCH-SENSING METHOD THEREOF

(75) Inventors: Kung-Chieh Huang, Hsin-Chu (TW); Hong-Ji Huang, Hsin-Chu (TW); Seok-Lyul Lee, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 363 days.

(21) Appl. No.: 12/876,473

(22) Filed: Sep. 7, 2010

(65) Prior Publication Data
US 2011/0057898 A1   Mar. 10, 2011

(30) Foreign Application Priority Data

Sep. 8, 2009 (TW) ................................ 98130297 A

(51) Int. Cl.
*G06F 3/041* (2006.01)
(52) U.S. Cl.
USPC ........................................................... 345/173
(58) Field of Classification Search
USPC ........................................................... 345/173
See application file for complete search history.

(56) References Cited

U.S. PATENT DOCUMENTS

| | | | |
|---|---|---|---|
| 5,283,558 A * | 2/1994 | Chan | 345/168 |
| 6,034,335 A * | 3/2000 | Aufderheide et al. | 200/5 A |
| 7,675,580 B2 | 3/2010 | Rho | |
| 2005/0041018 A1 | 2/2005 | Philipp | |
| 2009/0262292 A1* | 10/2009 | Lee | 349/149 |
| 2010/0238122 A1* | 9/2010 | Chang et al. | 345/173 |

* cited by examiner

*Primary Examiner* — Kent Chang
*Assistant Examiner* — Nathan Brittingham
(74) *Attorney, Agent, or Firm* — WPAT, PC; Justin King

(57) ABSTRACT

In a touch-sensing structure for a touch panel and a touch-sensing method thereof, the touch-sensing structure includes a plurality of first conducting wires paralleled to each other and a first conductor. A terminal of each first conducting wire is electrically coupled to the first conductor, so as to divide the conductor into a plurality of first line segments. The resistance of each first conducting wire is smaller than that of each first line segment. Wherein, when the displaying area of the touch panel receives an external force, a first conducting wire corresponding to the position designated by the external force is electrically coupled to a reference potential.

26 Claims, 13 Drawing Sheets

TOUCH-SENSING STRUCTURE FOR TOUCH PANEL AND TOUCH-SENSING METHOD THEREOF

CROSS-REFERENCE TO RELATED APPLICATIONS

This application is based upon and claims the benefit of priority from the prior Taiwan Patent Application No. 098130297, filed Sep. 8, 2009, the entire contents of which are incorporated herein by reference.

BACKGROUND

1. Technical Field

The present invention relates to a touch panel, and more particularly, to a touch-sensing structure for a touch panel, and a touch-sensing method thereof.

2. Description of the Related Art

With development of the touch screen, nowadays, two kinds of touch-sensing structures for embedded touch screen are used widely, one of which is a passive touch-sensing structure, and the other one is an active touch-sensing structure. The two kinds of touch-sensing structures are respectively shown in FIG. 1 and FIG. 2.

FIG. 1 is a schematic view of a touch screen employing the passive touch-sensing structure. Referring to FIG. 1, the touch screen includes a data driver 110, a touch panel 120, and a touch signal processing circuit 130. The touch panel 120 includes a plurality of pixels; each pixel is consisted of a thin-film transistor (TFT), a storage capacitor Cst, and a pixel capacitor Clc. In addition, the touch panel 120 further includes a plurality of data lines 140, a plurality of gate lines 150, a plurality of common lines 160, a plurality of sensing units 170, a plurality of first touch-signal reading lines 180-1, and a plurality of second touch-signal reading lines 180-2. These sensing units 170 are used to detect a touch position corresponding to a touch action imposed in the touch panel by a user. Each sensing unit 170 is electrically coupled to the touch signal processing circuit 130 via one of the first touch-signal reading lines 180-1 and one of the second touch-signal reading lines 180-2, so as to enable the touch signal processing circuit 130 to obtain X-axis and Y-axis coordinates of the touch position according to the signals transmitted through the touch-signal reading lines 180-1 and 180-2.

It can be found from FIG. 1 that a sensing resolution of this kind of touch screen is determined by a distribution density of the sensing units 170 in the touch panel 120. However, as each of the sensing units 170 is electrically coupled to the touch signal processing circuit 130 via the touch-signal reading lines 180-1 and 180-2, and the distribution density of the sensing units 170 is usually limited by the channel number of the touch signal processing circuit 130, and thereby the sensing resolution of the touch screen is always low. If the manufacturer wants to ensure the sensing resolution of the touch screen, a more expensive touch signal processing circuit 130 with more channels has to be adopted. This may increase the cost of the touch screen.

Moreover, because each of the sensing units 170 is electrically coupled to the touch signal processing circuit 130 via the touch-signal reading lines 180-1 and 180-2, more external wires for the touch panel are needed with the increase of the distribution density of the sensing units 170, and accordingly a width of the edge portion (not shown) for the touch panel 120 should also be increased. Furthermore, another deficiency arises in this kind of passive touch-sensing structure, specifically, the touch-sensing structure can only perform a so-called single touch sensing.

FIG. 2 is a schematic view of a touch screen employing the active touch-sensing structure. Referring to FIG. 2, the touch screen includes a data driver 210, a touch panel 220, and a touch signal processing circuit 230. The touch panel 220 includes a plurality of pixels. Each pixel is also consisted of a thin-film transistor (TFT), a storage capacitor Cst, and a pixel capacitor Clc. In addition, the touch panel 220 further includes a plurality of data lines 240, a plurality of gate lines 250, a plurality of common lines 260, a plurality of sensing units 270, and a plurality of touch-signal reading lines 280. These sensing units 270 are also used to detect a touch position of a user in the touch panel. Each sensing unit 270 is electrically coupled to the touch signal processing circuit 230 via one of the touch-signal reading lines 280, so as to enable the touch signal processing circuit 230 to obtain X-axis and Y-axis coordinates of the touch position according to the signals transmitted through the touch-signal reading lines 280.

It can be found from FIG. 2 that a sensing resolution of this kind of touch screen is also determined by a distribution density of the sensing units 270 in the touch panel 220. As the distribution density of the sensing units 270 is usually limited by the channel number of the touch signal processing circuit 230, the sensing resolution of the touch screen is always low. If the manufacturer wants to ensure the sensing resolution of the touch screen, a more expensive touch signal processing circuit 230 with more channels has to be adopted. This may increase the cost of the touch screen. Moreover, because each of the sensing units 270 is electrically coupled to the touch signal processing circuit 230 via the touch-signal reading lines 280, more external wires for the touch panel are needed with the increase of the distribution density of the sensing units 270, and accordingly a width of the edge portion (not shown) for the touch panel 220 will also be increased.

Although this active touch-sensing structure can perform multi touch sensing, an aperture ratio of the pixel is reduced and thereby diminishing the light transmission rate of the pixel because the sensing units 270 in this structure are made up of TFTs. In addition, as the sensing units 270 in this structure are coupled to the gate lines 250, and operate accompanying with scanning rate of the gate lines, a touch response speed of the touch screen is low.

What is needed, therefore, is a touch-sensing structure that can overcome the above-described deficiencies. What is also needed is a touch-sensing method.

BRIEF SUMMARY

The present invention relates to a touch-sensing structure for a touch panel. A touch screen using the touch-sensing structure can attain high sensing resolution without employing a touch signal processing circuit having a great number of channels. Moreover, peripheral wires for the touch panel of the touch screen can be reduced, and thereby it is unnecessary to enlarge the width of the edge portion for the touch panel. Further, compared with the conventional passive touch-sensing structure, the touch-sensing structure provided in the present invention has an ability of performing multi touch sensing. In addition, compared with the conventional active touch-sensing structure, the aperture ratio of the pixel in the touch-sensing structure provided in the present invention would not be reduced, and the touch-sensing response time thereof can also be faster.

The present invention also relates to a touch-sensing method corresponding to the touch-sensing structure.

In one aspect, the present invention provides a touch-sensing structure for a touch panel. The touch-sensing structure includes a first conductor and a plurality of first conducting wires paralleled to each other. A terminal of each first conducting wire is electrically coupled to the first conductor, so as to divide the first conductor into a plurality of first line segments. A resistance of each first conducting wire is smaller than that of each of the first line segments. When a display area of the touch panel receives an external force, the first conducting wire corresponding to a position designated by the external force is electrically coupled to a reference potential.

In another aspect, the present invention provides a touch-sensing method for a touch panel. The touch panel utilizes a touch-sensing structure including a first conductor and a plurality of parallel first conducing wires. A terminal of each first conducting wire is electrically coupled to the first conductor so as to divide the first conductor into a plurality of first line segments. A resistance of each first conducting wire is smaller than that of each of the first line segments. When a display area of the touch panel receives an external force, the first conducting wire corresponding to a position designated by the external force is electrically coupled to a reference potential. The method includes the steps of determining whether a touch action is performed; and calculating, when a touch action is performed, coordinates of a touch position according to resistances of two equivalent resistors respectively measured at two terminals of the first conductor.

In yet one aspect, the present invention provides a touch-sensing structure for a touch panel. The touch-sensing structure includes a conductor having N conducting structures paralleled to each other. Each of the conducting structures includes a first conducting wire and a second conducting wire in parallel. Each of the conducting wires includes a first terminal indicating a first direction and a second terminal indicating a second direction. The first terminal of the first conducting wire of the $K^{th}$ conducting structure is electrically coupled to the first terminal of the second conducting wire of the $K^{th}$ conducting structure, and the second terminal of the second conducting wire of the $K^{th}$ conducting structure is electrically coupled to the second terminal of the first conducting wire of the $(K+1)^{th}$ conducting structure, where N and K are both natural numbers, $1 \leq K < N$. Two touch-signal reading lines are configured to be electrically coupled to two ends of the conductor respectively. When a display area of the touch panel receives an external force, the first conducting wire corresponding to a position designated by the external force is electrically coupled to a reference potential.

In another aspect, the present invention provides a touch-sensing method for a touch panel. The touch panel utilizes a touch-sensing structure including a conductor and two touch-signal reading lines. The conductor includes N conducting structures paralleled to each other. Each of the conducting structures includes a first conducting wire and a second conducting wire in parallel. Each of the conducting wires includes a first terminal indicating a first direction and a second terminal indicating a second direction. The first terminal of the first conducting wire of the $K^{th}$ conducting structure is electrically coupled to the first terminal of the second conducting wire of the $K^{th}$ conducting structure, and the second terminal of the second conducting wire of the $K^{th}$ conducting structure is electrically coupled to the second terminal of the first conducting wire of the $(K+1)^{th}$ conducting structure, where N and K are both natural numbers, $1 \leq K < N$. When a display area of the touch panel receives an external force, the first conducting wire corresponding to a position designated by the external force is electrically coupled to a reference potential. The two touch-signal reading lines are configured to be electrically coupled to two ends of the conductor respectively. The method includes the steps of determining whether a touch action is performed; and calculating, when a touch action is performed, a coordinate of a touch position according to a resistance of a equivalent resistor measured at an end of the first conductor.

The present invention utilizes a conductor and a plurality of parallel conducting wires to form a touch-sensing structure which is suitable for performing one-dimension coordinate sensing. As a resistance of each conducting wire is smaller than that of each line segment of the conductor, the resistance of each conducting wire can be ignored. Once the touch screen determines that a touch action is performed, resistances of the two equivalent resistors can be measured at two terminals of the conductor. The two measured resistances can be used to represent different numbers of line segments, and accordingly the one-dimension coordinate of the touch position can be calculated. By making use of two touch-sensing structures as described above, two-dimension coordinates of the touch position can be obtained so long as an extra process of determining the actual touch position is carried out.

Similarly, a plurality of conducting structures paralleled to each other can also be used to form a conductor, and thereby form another touch-sensing structure capable of performing two-dimension coordinates sensing in the present invention. As the farther a distance from the touch position to a terminal of the conductor, the greater the measured resistances of the equivalent resistor, once the touch screen determines that a touch action is performed, the two-dimension coordinates of the touch position can be calculated according to the resistance of the equivalent resistor measured at a terminal of the conductor.

As described above, the present invention mainly utilizes the above conductor to obtain the coordinates of the touch position, and the touch signal processing circuit can carry out such operation merely through being coupled to the terminals of the conductor. Thus, the touch screen using the touch-sensing structure provided in the present invention can attain high sensing resolution without employing a touch signal processing circuit having a great number of channels. Moreover, peripheral wires for the touch panel of the touch screen can be less, and thereby it is unnecessary to enlarge the width of the edge portion for the touch panel. Further, as the resistances of the two equivalent resistors can respectively be measured at the two terminals of a same conductor, so as to represent different numbers of line segments, or to calculate the distance between the touch position and the terminals of the conductors according to the resistances of the two equivalent resistors, the touch-sensing structure provided in the present invention has an ability of performing multi touch sensing, while compared with the conventional passive touch-sensing structure. In addition, compared with the conventional active touch-sensing structure, it is not necessary to employ any transistor to form the sensing unit in the touch-sensing structure provided in the present invention, and accordingly the aperture ratio of the pixel in the touch panel can be ensured, and the touch-sensing response time thereof can also be lowered.

Other novel features and advantages will become more apparent from the following detailed description when taken in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to described preferred and exemplary embodiments in detail.

Figure 1:
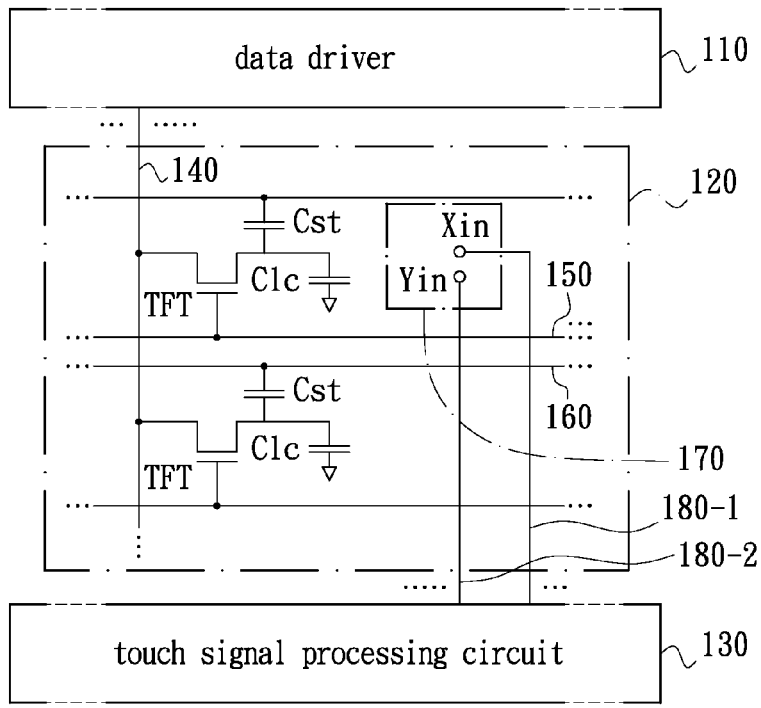
FIG. 1 is a schematic view of a touch screen employing a conventional passive touch-sensing structure.
Figure 2:
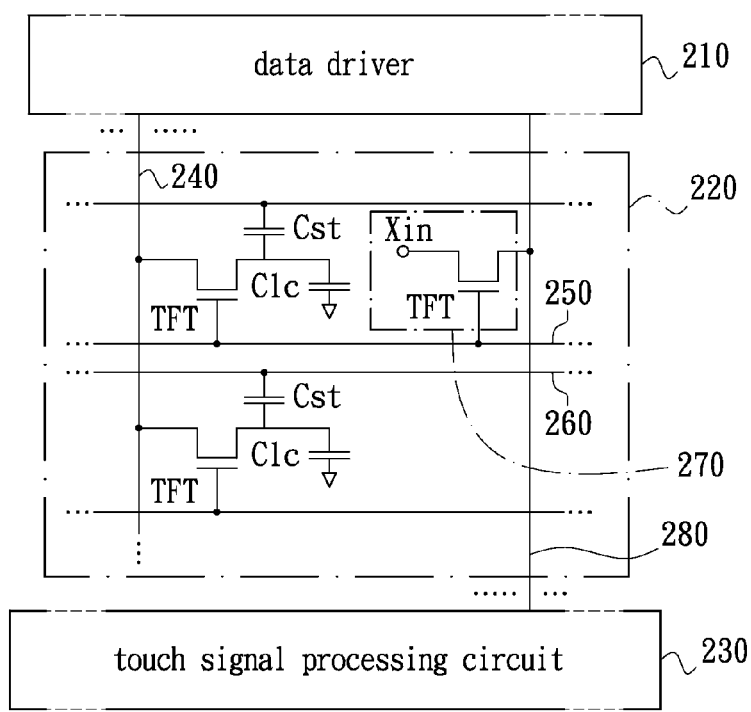
FIG. 2 is a schematic view of a touch screen employing a conventional active touch-sensing structure.
Figure 3:
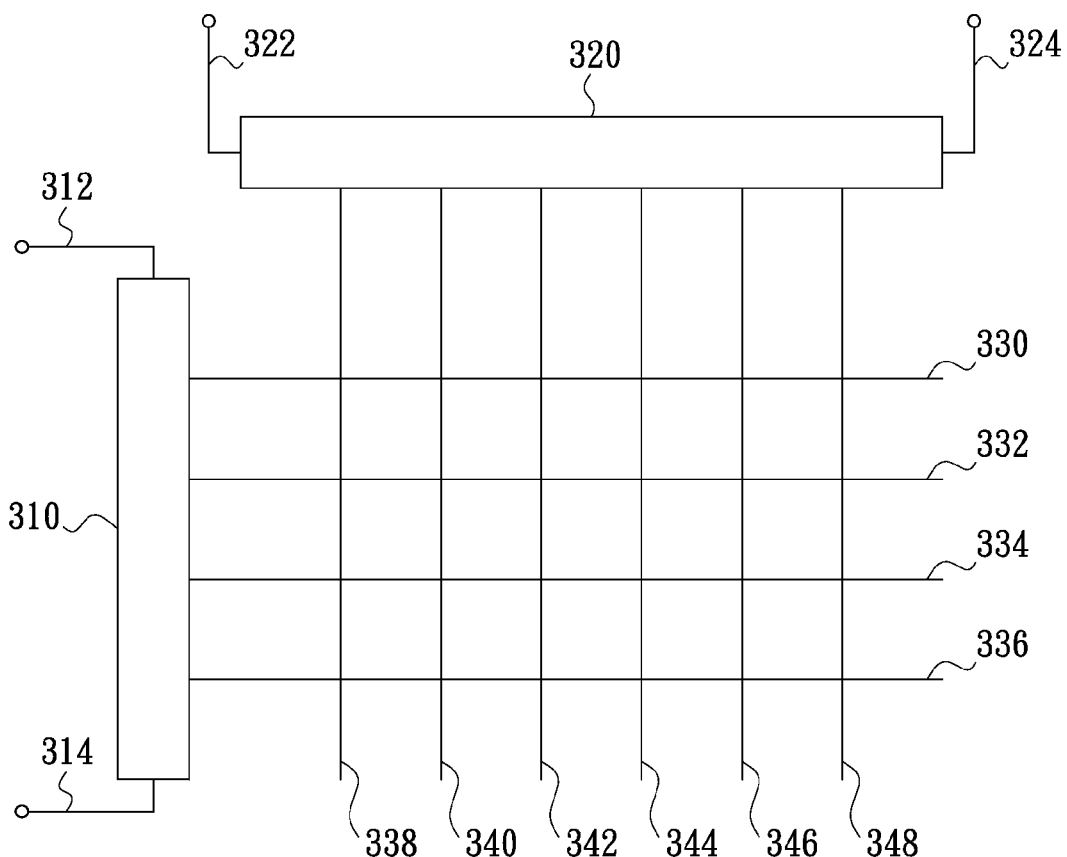
FIG. 3 illustrates a touch-sensing structure for a touch panel according to a first embodiment of the present invention.

Referring to FIG. 3, a touch-sensing structure for a touch panel according to a first embodiment of the present invention is illustrated. The touch-sensing structure is applicable for sensing two-dimension coordinates of a touch position. As FIG. 2 shown, the touch-sensing structure includes a first conductor 310, a second conductor 320, and a plurality of conducting wires 330-348. Moreover, the touch-sensing structure further includes touch-signal reading lines 312, 314, 322, and 324. The conducting wires 330-336 are disposed in parallel, and one terminal of each of the conducting wires 330-336 is electrically coupled to the first conductor 310, so as to divide the first conductor 310 into a plurality of first line segments. The conducting wires 338-348 are disposed in parallel and substantially perpendicular to the conducting wires 330-336. One terminal of each of the conducting wires 338-348 is electrically coupled to the second conductor 320, so as to divide the second conductor 320 into a plurality of second line segments.

The conductors 310 and 320 are made from special material, such that a resistance of each line segment is greater than that of each conducting wire. In ideal, a resistance of each line segment in the conductor 310, 320 should be far greater than that of each conducting wire. In this embodiment, the conductors 310 and 320 are made from conductive material Indium Tin Oxide (ITO), and the conductors 310 and 320 are perpendicular to each other. As for the touch-signal reading lines 312 and 314, each of these two lines has a terminal electrically coupled to an end of the first conductor 310, and the other terminal of each of the touch-signal reading lines 312 and 314 is configured to be electrically coupled to a touch signal processing circuit (not shown) or other similar processing circuit. Similarly, each of touch-signal reading lines 322 and 324 has a terminal electrically coupled to an end of the first conductor 320, and the other terminal of each of the touch-signal reading lines 322 and 324 is configured to be electrically coupled to the touch signal processing circuit or other similar processing circuit.

Figure 4:
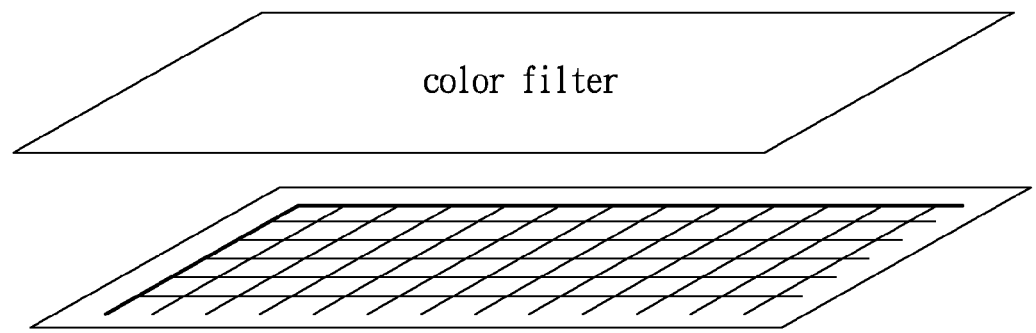
FIG. 4 illustrates a configuration relation in space between a color filter of the touch panel and the touch-sensing structure.
Figure 5:
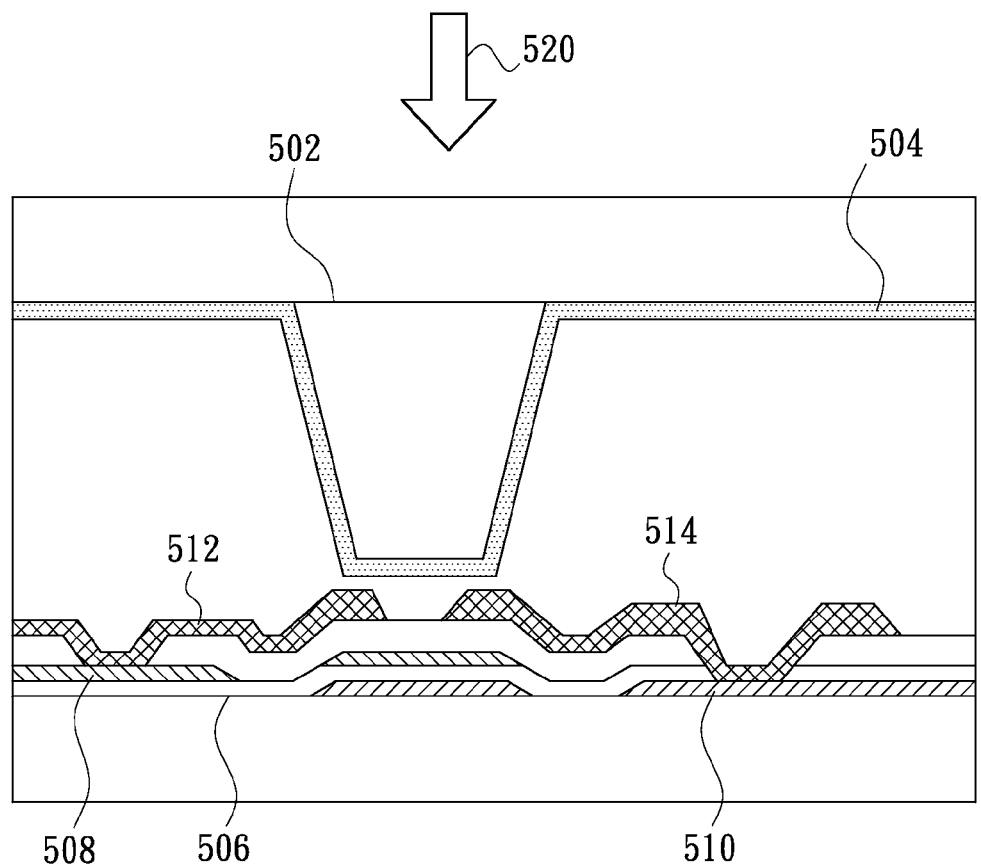
FIG. 5 is a cross-sectional view of the touch panel.

The touch-sensing structure as shown in FIG. 3 is suitable for cooperating with a color filter of the touch panel, which is described as follow accompanying with FIG. 4 and FIG. 5. FIG. 4 illustrates a configuration relation in space between a color filter of the touch panel and the touch-sensing structure. As FIG. 4 shown, the color filter is disposed upon the touch-sensing structure. Referring to FIG. 5, a cross-sectional view of the touch panel is illustrated. As FIG. 5 shown, a plurality of photo spacers are distributed at a lower surface 502 of the color filter, and a layer of conductive material ITO (labeled with 504) covers both the photo spacers and the lower surface of the color filter. Besides, the layer of conductive material ITO 504 is further electrically coupled to a reference potential Vcom (not shown). A first metal layer 508 and a second metal layer 510 are disposed on an upper surface 506 of an array substrate. The first metal layer 508 is configured to form the conducting wires 330-336 of FIG. 3, while the second metal layer 510 is configured to form the conducting wires 338-348 of FIG. 3. Alternatively, the first metal layer 508 can also be configured to form the conducting wires 338-348 of FIG. 3, while the second metal layer 510 is configured to form the conducting wires 330-336 of FIG. 3.

Each conductive line formed by the first metal layer 508 extends to a position under the corresponding photo spacers via conductive material ITO (labeled with 512), and each conductive line formed by the first metal layer 510 also extends to a position under the corresponding photo spacers via conductive material ITO (labeled with 514). With this configuration, when the displaying area (not shown) of the touch panel receives an external force (labeled with 520), the photo spacer corresponding to the position designated by the external force is forced to lower down. This causes the conductive material ITO 504 to touch the conductive material 512 and 514 corresponding to the photo spacer, such that conductive wires in both X-direction and Y-direction, which corresponds to the photo spacer, are electrically coupled to the reference potential Vcom. That is, conducting the conductive wires in both X-direction and Y-direction corresponding to the position designated by the external force is electrically coupled to the reference potential Vcom.

Figure 6:
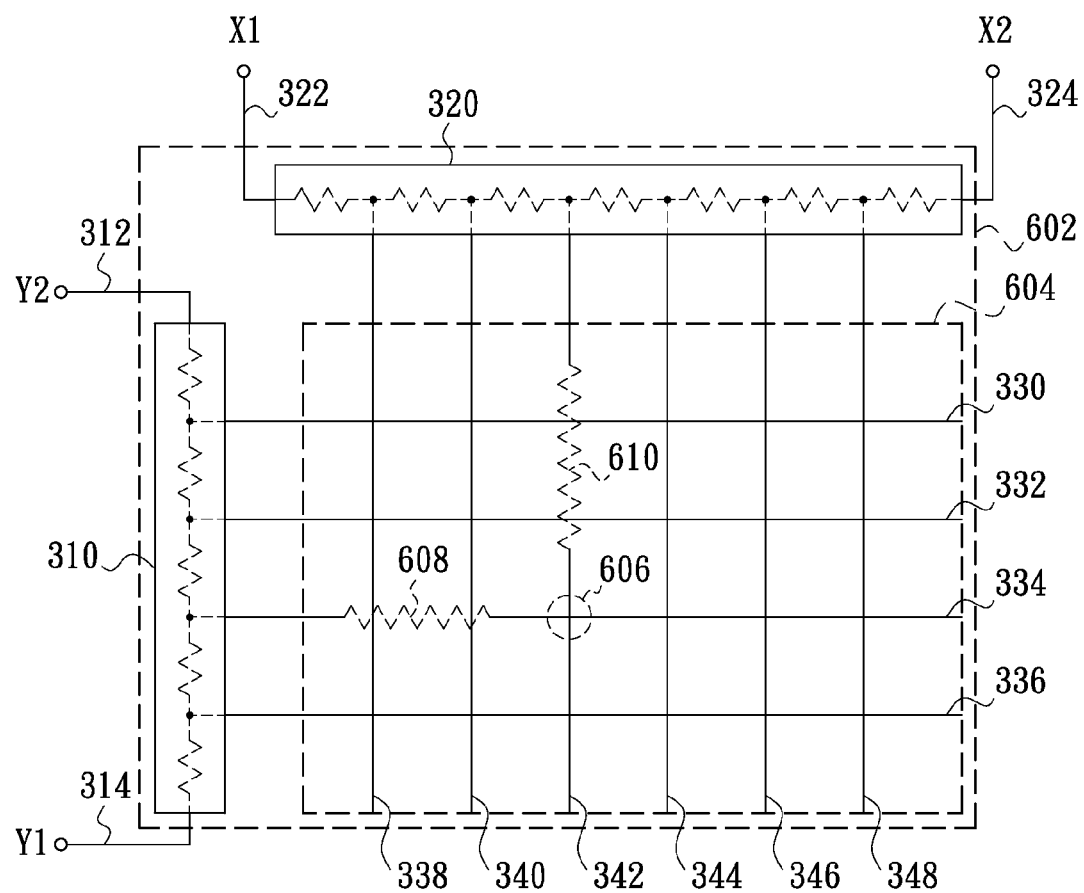
FIG. 6 illustrates how the touch-sensing structure of FIG. 3 performs a single touch sensing.

FIG. 6 illustrates how the touch-sensing structure of FIG. 3 performs a single touch sensing. Referring to FIG. 6, when an external force is applied to an display area 604 of the touch panel 602, the conducting wires 334 and 342, which corresponds to the position (labeled with 606, hereinafter, the touch position) designated by the external force, are electrically coupled to a reference potential Vcom. As the touch position is where the conducting wires 334 and 342 electrically coupled to the reference potential Vcom, a line segment from the touch position 606 to the first conductor 310 can be equivalent to a first resistor 608, and a line segment from the touch position 606 to the second conductor 602 can also be equivalent to a second resistor 610.

Because the resistance of each conducting wire is far less than that of each line segment of the conductors 310 and 320, the resistances of the first and second resistors 608 and 610 are so smaller that can be ignored. Thus, if the resistance of each line segment of the conductor 310 and 320 is $R_s$ a resistance of an equivalent resistor measured from a terminal Y1 is about $2R_s$ and a resistance of an equivalent resistor measured from a terminal Y2 is about $3R_s$. Similarly, a resistance of an equivalent resistor measured from a terminal X1 is about $3R_s$, and a resistance of an equivalent resistor measured from a terminal Y2 is about $4R_s$. Therefore, an X-axis coordinate of the touch position 606 can be calculated according to the two measured resistances respectively obtained at both terminals of the first conductor 310, and a Y-axis coordinate of the touch position 606 can be calculated according to the two measured resistances respectively obtained at both terminals of the second conductor 320. As such, the two-dimension coordinates of the touch position 606 can be sensed.

Figure 7:
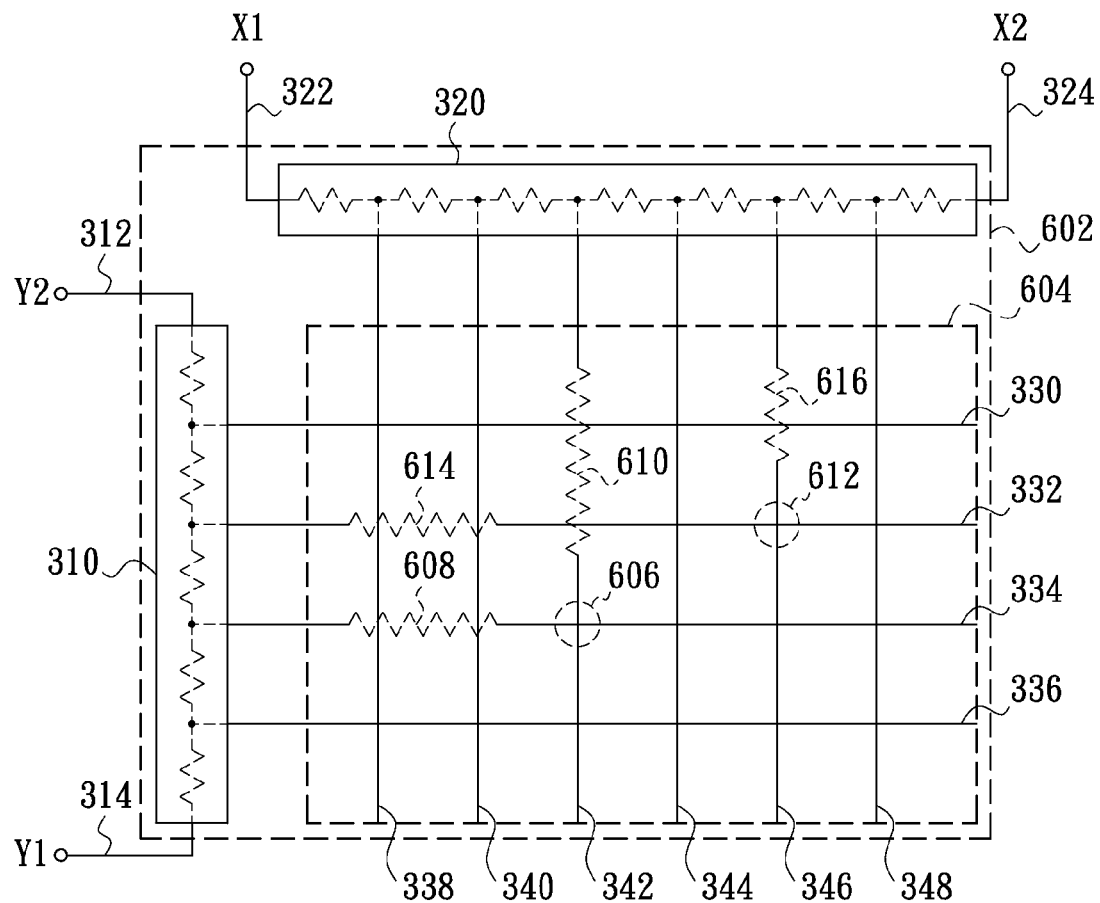
FIG. 7 illustrates how the touch-sensing structure of FIG. 3 performs a multi touch sensing.

FIG. 7 illustrates how the touch-sensing structure of FIG. 3 performs a multi touch sensing. Two touch positions, labeled with 606 and 612 respectively, are shown in FIG. 7. Equivalent resistors from the touch positions to line segments of corresponding conductors in the corresponding conducting wires are labeled with 608, 610, 614, and 616, respectively. If a resistance of each line segment of the conductor 310 and 320 is $R_s$ and resistances of the equivalent resistors 608, 610, 614, and 616 are respectively $R_{m1}$, $R_{n1}$, $R_{m2}$, and $R_{n2}$, and theoretically, a resistance $R_{Y1}$ of an equivalent resistor measured from a terminal Y1, a resistance $R_{Y2}$ of an equivalent resistor measured from a terminal Y2, a resistance $R_{X1}$ of an equivalent resistor measured from a terminal X1, and a resistance $R_{X2}$ of an equivalent resistor measured from a terminal X2 can respectively expressed by the following formulae (1)-(4).

$$R_{Y1} = 2R_s + \frac{R_{m1} \times (R_s + R_{m2})}{R_{m1} + (R_s + R_{m2})} \quad (1)$$

$$R_{Y2} = 2R_s + \frac{R_{m2} \times (R_s + R_{m1})}{R_{m2} + (R_s + R_{m1})} \quad (2)$$

$$R_{X1} = 3R_s + \frac{R_{n1} \times (2R_s + R_{n2})}{R_{n1} + (2R_s + R_{n2})} \quad (3)$$

$$R_{X2} = 2R_s + \frac{R_{n2} \times (2R_s + R_{n1})}{R_{n2} + (2R_s + R_{n1})} \quad (4)$$

As the resistance $R_{m1}$, $R_{n1}$, $R_{m2}$, and $R_{n2}$ are so small that can be ignored, the actual measured resistances $R_{Y1}$, $R_{Y2}$, $R_{X1}$, and $R_{X2}$ are respectively about $2R_s$, $2R_s$, $3R_s$, and $2R_s$.

Following with the above description, from the four values of $2R_s$, $2R_s$, $3R_s$, and $2R_s$, it can be found that a length about two line segments of the first conductor 310 counted from the terminal Y1 can be treated as corresponding to a touch position, and a length about two line segments of the first conductor 310 counted from the terminal Y2 can also be treated as corresponding to another touch position. Similarly, a length about three line segments of the second conductor 320 counted from the terminal X1 can be treated as corresponding to another touch position, and a length about two line segments of the second conductor 320 counted from the terminal X2 can also be treated as corresponding to another touch position. Thus, there may be four possible touch positions, including touch positions 606 and 612, a cross point for the conducting wires 334 and 336, and a cross point for the conducting wires 332 and 342. Because only two of the above four possible touch positions are actual touch positions, a further determination for the actual touch positions is needed, so as to obtain the two-dimension coordinates of the actual touch positions.

Two methods for determining the actual touch positions are provided as follows. It should be noted that these two illustrated methods should not be treated as limitation of the present invention.

Referring to FIG. 7 again, one of the methods is to calculate the values of $R_{m1}$ and $R_{m2}$ according to the above formulae (1) and (2), and to calculate the values of $R_{n1}$ and $R_{n2}$ according to the above formulae (3) and (4). Alternatively, the resistance $R_{m1}$ can also be calculated out according to a known fixed value $R_s$, for example, through subtracting $2R_s$ from the actual measured resistance $R_{Y1}$ directly, and the resistance $R_{m2}$ can be calculated out through subtracting $2R_s$ from the actual measured resistance $R_{Y2}$ directly. Similarly, the resistance $R_{m3}$ can be calculated out through subtracting $3R_s$ from the actual measured resistance $R_{X1}$ directly, and the resistance $R_{m4}$ can be calculated out through subtracting $2R_s$ from the actual measured resistance $R_{X2}$ directly. Then, the actual touch positions can be determined according to a relationship between the two resistances $R_{m1}$ and $R_{m2}$, as well as a relationship between the two resistances $R_{n1}$ and $R_{n2}$. For this example, as the resistance $R_{m1}$ is smaller than $R_{m2}$, and the resistance $R_{n1}$ is greater than $R_{n2}$, the touch positions 606 and 612 should be regarded as the actual touch positions. Therefore, the two-dimension coordinates of these two actual touch positions can be obtained.

Referring to FIG. 7 again, in a second method, the actual touch positions are determined according to the touch time difference. Assuming the touch position 606 is sensed first, coordinates of the touch position 606 in an X-axis direction (namely, a first dimension direction) and a Y-axis direction (namely, a second dimension direction) can be recorded. After that, the touch position 612 is then be sensed. Thereby, the touch position 612, a cross point of the conducting wires 334 and 346, and a cross point of the conducting wires 332 and 342 are all regarded as possible touch positions. As such, the actual touch position can be determined from these latterly sensed possible touch positions according to the recorded coordinates.

For instance, based on the recorded coordinates, the one among the latterly sensed possible touch positions, which has an X-axis coordinate the same as that of the recorded coordinates, can be removed, such that the cross point of the conducting wires 334 and 346 can be excluded from the actual touch positions. Then, the one among the latterly sensed possible touch positions, which has a Y-axis coordinate the same as that of the recorded coordinates, can also be removed, such that the cross point of the conducting wires 332 and 342 can be excluded from the actual touch positions. The rest one of the latterly sensed possible touch positions, i.e., the touch position 612, can accordingly be treated as another actual touch position. In an alternative embodiment, the possible touch positions having a Y-axis coordinate the same as that of the recorded coordinates can be removed firstly, and after that, the possible touch positions having an X-axis coordinate the same as that of the recorded coordinates is removed. As such, the two-dimension coordinates of both of the actual touch positions can be obtained.

Further, when a pressing object providing the external force slides, each actual touch position obtained in a first time instance can be taken to find touch positions respectively having shortest distances thereto from the possible touch positions obtained in a second time instance (later than the first time instance). The found touch positions can be regarded as the actual touch positions at the second time instance, and thereby a group of coordinates can be obtained. Accordingly, a sliding trail of the press object can be presented in accordance with the above group of coordinates.

From the first embodiment, it can be taught that the sensing of touch positions may also be implemented merely based on the first conductor 310 and the conducting wires 330-336, or based on the second conductor 320 and the conducting wires 338-348. While sensing a one-dimension coordinate of the touch position, only two resistances respectively measured at the two terminal of the corresponding conductor are needed, and the one-dimension coordinate can be calculated according to these two resistances. However, while sensing two-dimension coordinates of the touch position, the formulae (1)-(2), or (3)-(4) would be applied to calculate the other coordinate.

Figure 8:
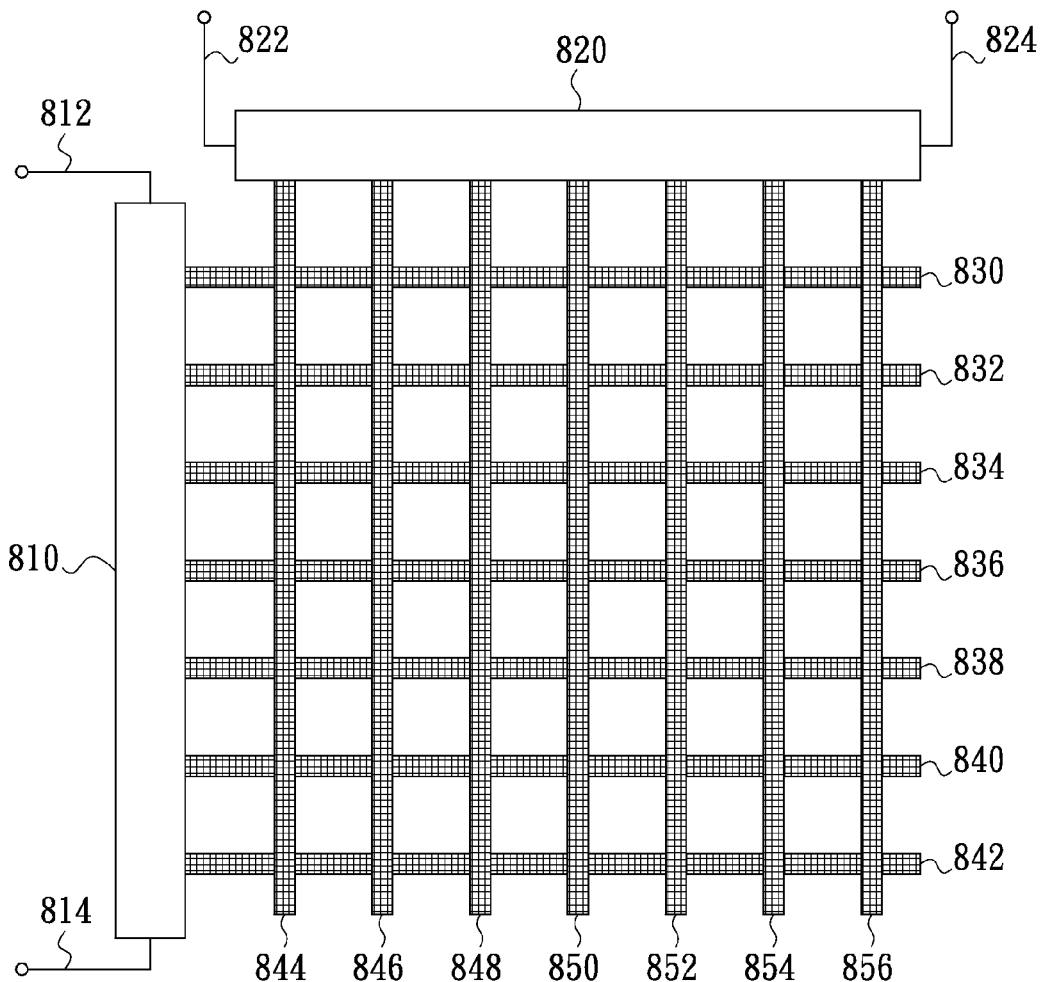
FIG. 8 illustrates a touch-sensing structure for a touch panel according to a second embodiment of the present invention.

It should be noted that the above embodiment is one of the exemplary modes of the first embodiment. Referring to FIG. 8, a touch-sensing structure for a touch panel according to another embodiment of the present invention is shown. In FIG. 8, labels 810 and 820 represent conductors, labels 812, 814, 822, and 824 represent touch-signal reading lines, and labels 830-856 represent conducting wires. In this embodiment, a width of each conducting wires 830-856 is increased, such that resistances of the conducting wires are lessened.

Figure 9:
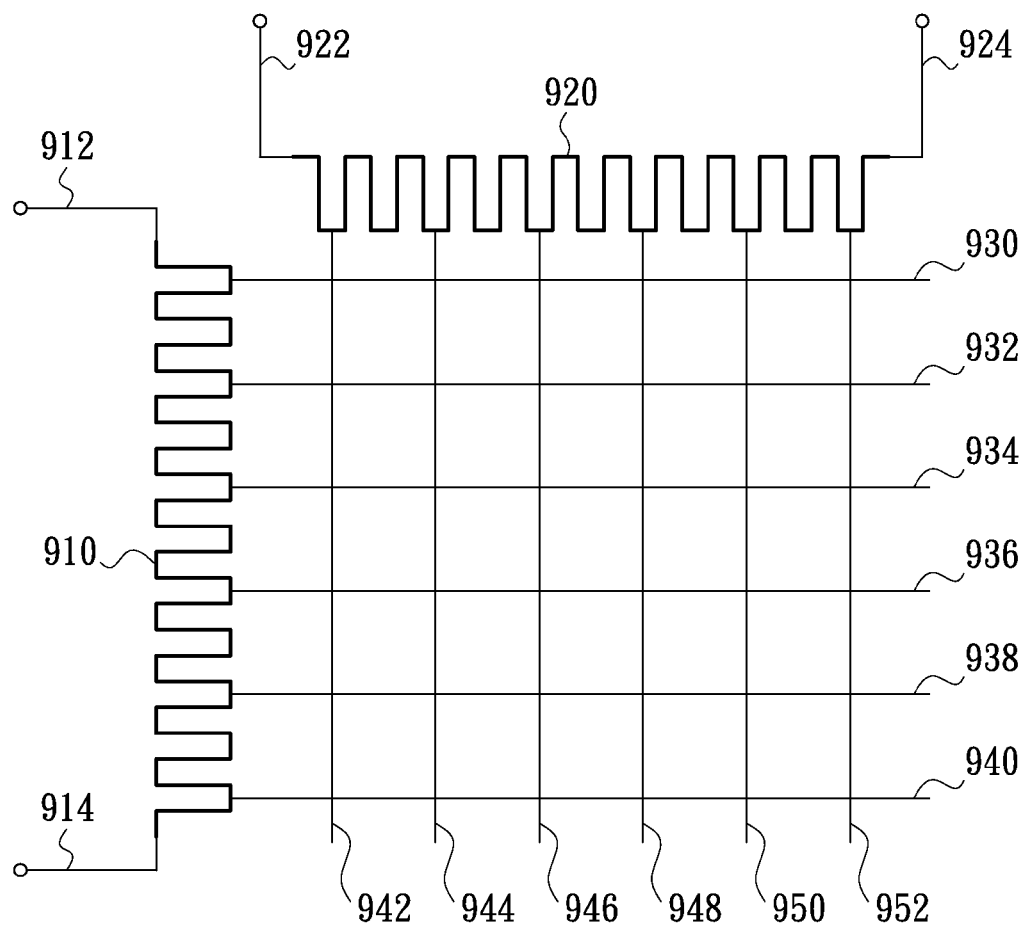
FIG. 9 illustrates a touch-sensing structure for a touch panel according to a third embodiment of the present invention.

The above embodiment is also only one of the exemplary modes of the first embodiment. Referring to FIG. 9, a touch-sensing structure for a touch panel according to another embodiment of the present invention is shown. In FIG. 9, labels 910 and 920 represent conductors, labels 912, 914, 922, and 924 represent touch-signal reading lines, and labels 930-952 represent conducting wires in FIG. 9. In this embodiment, each of the conductors 910 and 920 has continual folds, such that resistances of the conductors 910 and 920 are increased.

Figure 10:
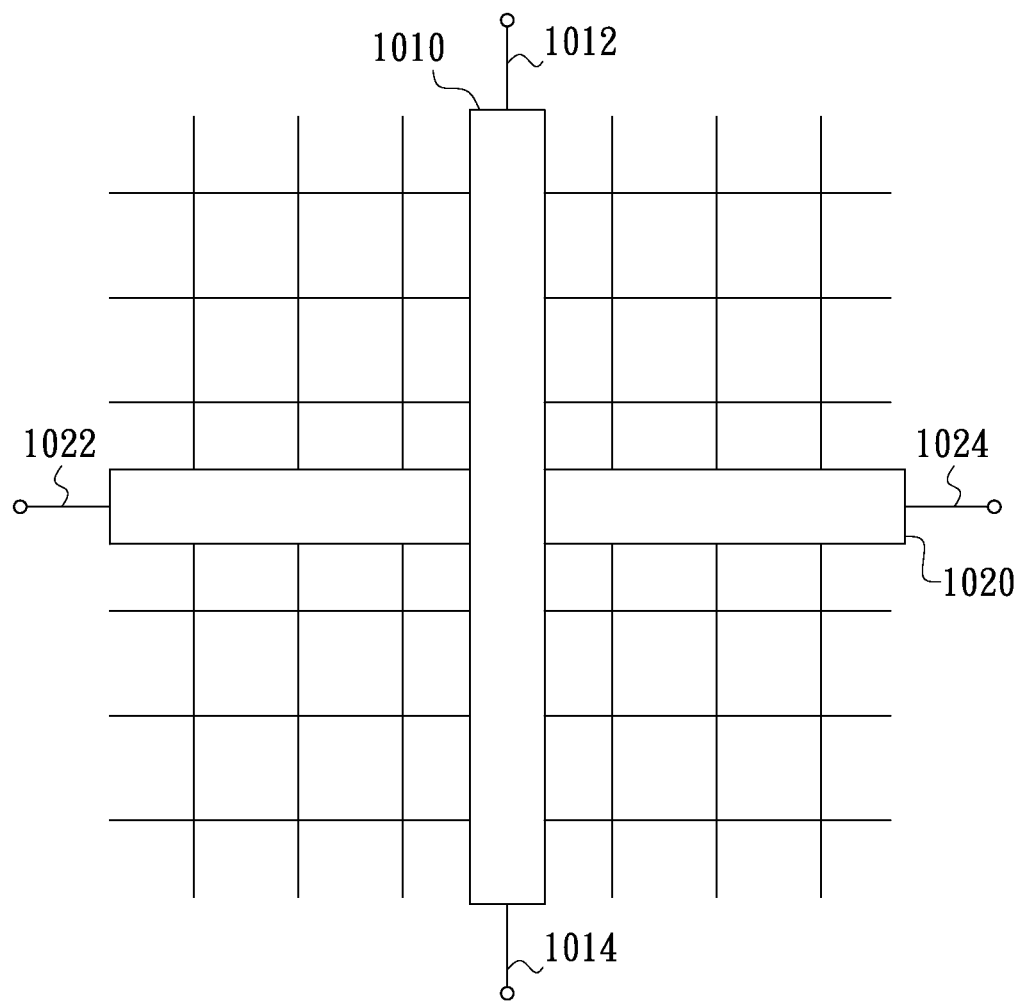
FIG. 10 illustrates a touch-sensing structure for a touch panel according to a fourth embodiment of the present invention.

The above embodiment is also only one of the exemplary modes of the first embodiment. Referring to FIG. 10, a touch-sensing structure for a touch panel according to another embodiment of the present invention is shown. In FIG. 10, labels 1010 and 1020 represent conductors, labels 1012, 1014, 1022, and 1024 represent touch-signal reading lines, and other lines in both X-direction and Y-direction represent conducting wires in FIG. 10. In this embodiment, the conductors 1010 and 1020 cross to each other, and all the conducting wire in the X-direction are electrically coupled to the conductor 1010, all the conducting wires in the Y-direction are electrically coupled to the conductor 1020.

Figure 11:
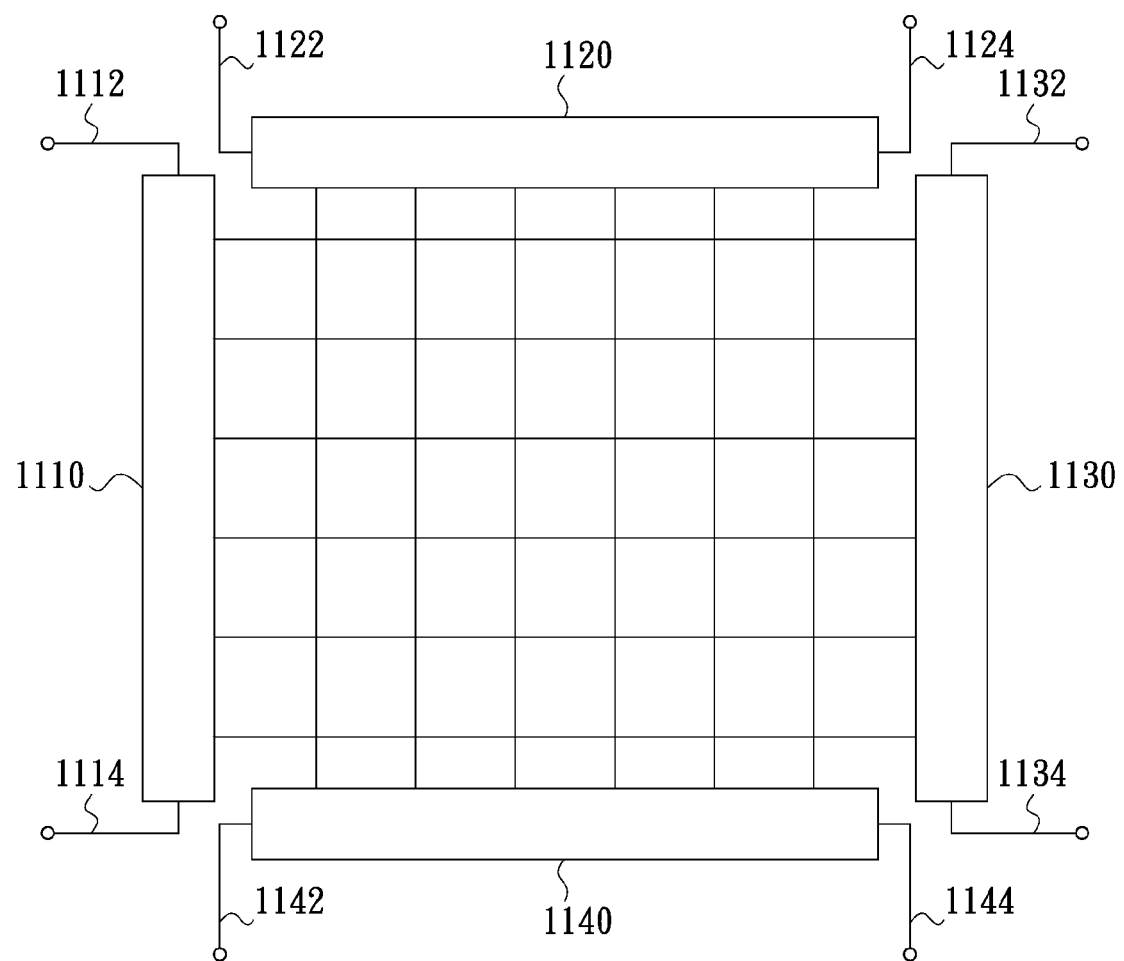
FIG. 11 illustrates a touch-sensing structure for a touch panel according to a fifth embodiment of the present invention.

The above embodiment is also only one of the exemplary modes of the first embodiment. Referring to FIG. 11, a touch-sensing structure for a touch panel according to another embodiment of the present invention is shown. In FIG. 11, labels 1110, 1120, 1130, and 1140 represent conductors, labels 1112, 1114, 1122, 1124, 1132, 1134, 1142, and 1144 represent touch-signal reading lines, and other lines in both X-direction and Y-direction represent conducting wires in FIG. 11. In this embodiment, the conductor 1130 is parallel to the conductor 1110, and the conductor 1140 is parallel to the conductor 1120. Besides, two terminals of each conducting wire in the X-direction are respectively electrically coupled to the conductor 1110 and the conductor 1130, and two terminals of each conducting wire in the Y-direction are respectively electrically coupled to the conductor 1120 and the conductor 1140.

In the above embodiment, the conductors 1130 and 1140 are back-up conductors, and the touch-signal reading lines 1132, 1134, 1142, and 1144 are back-up touch-signal reading lines. When any of the conductors 1110, 1120 and the corresponding touch-signal reading lines thereof suffers damage, for example, being impaired by electrostatics upon the condition that an electrostatic discharge (ESD) which may disable the sensing of touch positions made use of the conductors 1110 and 1120 occurs, the back-up conductors 1130 and 1140 can be applied to sense the touch positions. Alternatively, the conductors 1110 and 1120 may also serve as back-up conductors. By using the back-up conductors and the back-up touch-signal reading lines, the sensing process of the touch-sensing structure is more stable and reliable, and can prevent from the impairment of ESD.

Figure 12:
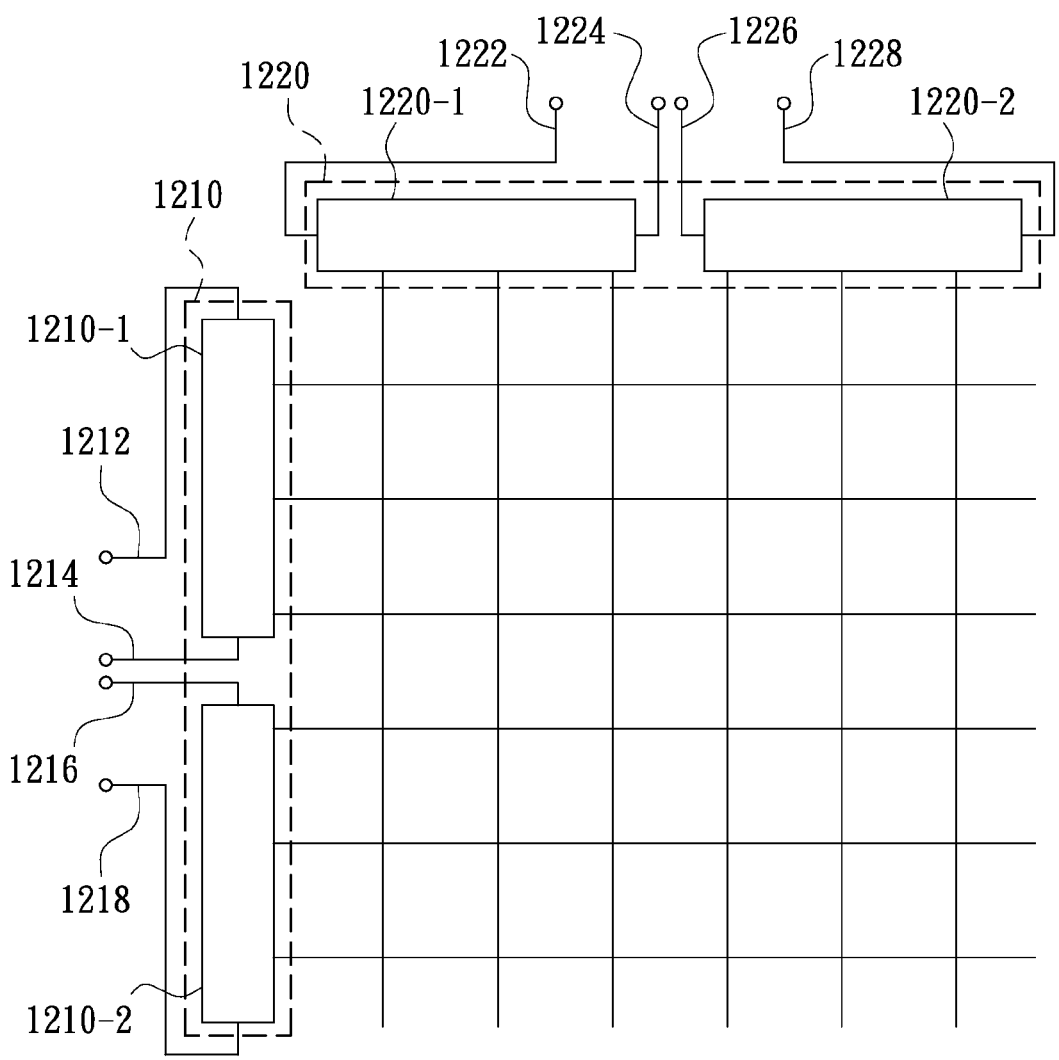
FIG. 12 illustrates a touch-sensing structure for a touch panel according to a sixth embodiment of the present invention.

The above embodiment is also only one of the exemplary modes of the first embodiment. Referring to FIG. 12, a touch-sensing structure for a touch panel according to another embodiment of the present invention is shown. In FIG. 12, labels 1210 and 1120 represent conductors, labels 1212, 1214, 1216, 1218, 1222, 1224, 1226, and 1228 represent touch-signal reading lines, and other lines in both X-direction and Y-direction represent conducting wires in FIG. 12. In this embodiment, the conductor 1210 includes components 1210-1 and 1210-2, and the component 1210-1 and the component 1210-2 are separated to each other. The component 1210-1 is configured to electrically couple to part of the conducting lines in the X-direction, and the component 1210-2 is configured to electrically couple to the rest of the conducting lines in the X-direction.

Similarly, the conductor 1220 includes components 1220-1 and 1220-2, and the component 1220-1 and the component 1220-2 are also separated to each other. The component 1220-1 is configured to electrically couple to part of the conducting lines in the Y-direction, and the component 1220-2 is configured to electrically couple to the rest of the conducting lines in the Y-direction. From the above description about FIG. 3, it can be found that an X-direction conductor, together with a Y-direction conductor, can at least perform the sensing of two touch positions. Thus it can be inferred that the touch-sensing structure as illustrated in FIG. 12 can used for perform the sensing of more than two touch positions, and thereby being capable of multiple point sensing.

Figure 13:
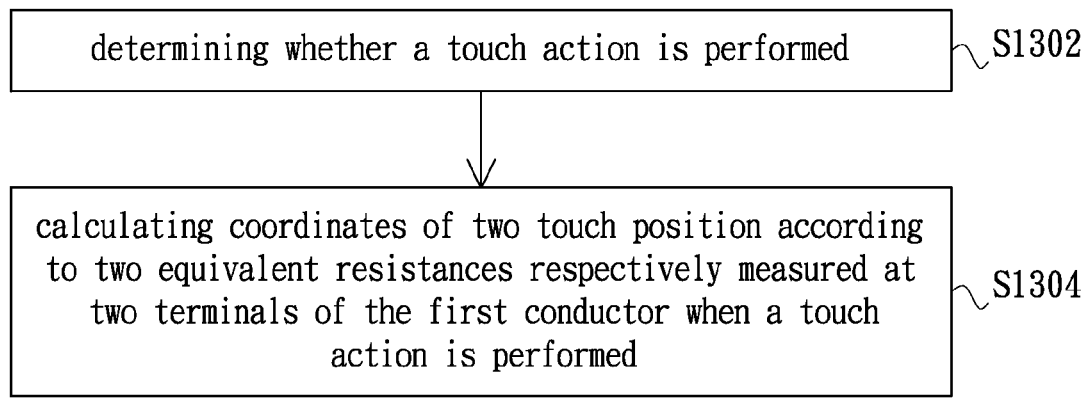
FIG. 13 is a flow chart of a touch-sensing method according to an embodiment of the present invention.

Based on the teaching of the above first to seventh embodiments, a basic operation method can be summarized as FIG. 13. FIG. 13 is a flow chart of a touch-sensing method according to an embodiment of the present invention, which can be applied in a touch panel. The touch panel has a touch-sensing structure, and the touch-sensing structure includes a first conductor and a plurality of parallel first conducting wires. A terminal of each first conducting wire is electrically coupled to the first conductor, so as to divide the conductor into a plurality of first line segments. The resistance of each first conducting wire is smaller than that of each first line segment. When an external force is applied to the displaying area of the touch panel, one of the first conducting wires corresponding to the position designated by the external force is electrically coupled to a reference potential. The method includes the steps of determining whether a touch action is performed (as shown in step S1302); calculating coordinates of the touch position according to two equivalent resistances respectively measured at two terminals of the first conductor when a touch action is performed (as shown in step S1304).

Figure 14:
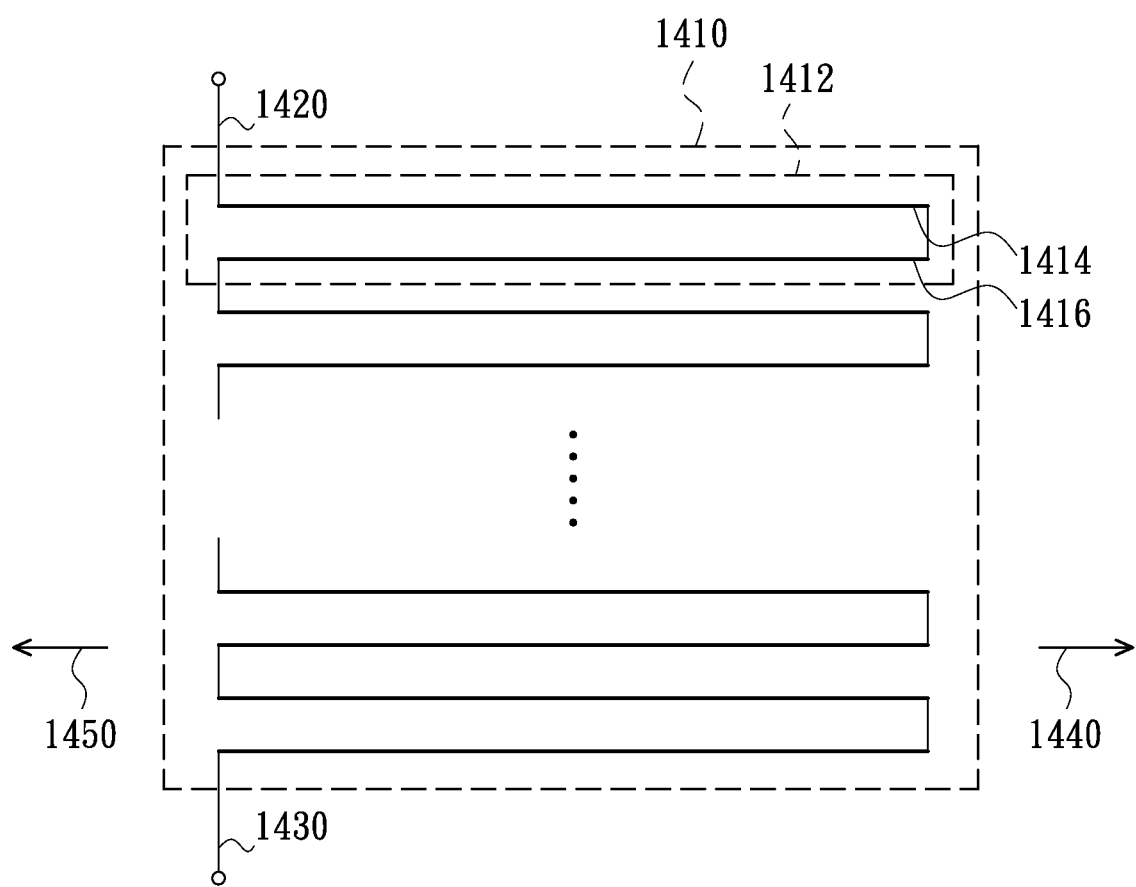
FIG. 14 illustrates a touch-sensing structure for a touch panel according to another embodiment of the present invention.

Referring to FIG. 14, a touch-sensing structure for a touch panel according to another embodiment of the present invention is shown. The touch-structure is adapted to sense two-dimension coordinates of a touch position. As shown in FIG. 14, the touch-sensing structure includes touch-signal reading lines 1420 and 1430, other than a conductor 1410. The conductor 1410 includes N conducting structures (labeled with 1412) paralleled to each other. Each conducting structure includes a first conducting wire and a second conducting wire in parallel, which are labeled with 1414 and 1416. Each conducting wire includes a first terminal (as shown by an arrow 1440) and a second terminal (as shown by an arrow 1450).

The first terminal of the first conducting wire of the $K^{th}$ conducting structure is electrically coupled to the first terminal of the second conducting wire of the $K^{th}$ conducting structure, and the second terminal of the second conducting wire of the $K^{th}$ conducting structure is electrically coupled to the second terminal of the first conducting wire of the (K+1)th conducting structure, where N and K are both natural numbers, and $1 \leq K < N$. The above two touch-signal reading lines are respectively electrically coupled to the two terminal of the conductor 1410. When an external force is applied to the display area of the touch panel, a portion of conductor 1410 corresponding to the position designated by the external force is electrically coupled to a reference potential Vcom.

As the farther a distance from the touch position to the conductor 1410, the greater the resistance of the measured equivalent resistor, thus, while the touch screen determines that a touch action is performed, the two-dimension coordinates of the touch position can be calculated according to the resistance of the equivalent resistor measured at a terminal of the conductor 1410, such that a single touch sensing can be realized. Moreover, a multi touch sensing can be achieved while calculating the two-dimension coordinates of the touch positions according to the resistances of the two equivalent resistors respectively measured at the two terminals of the conductor 1410.

Figure 15:
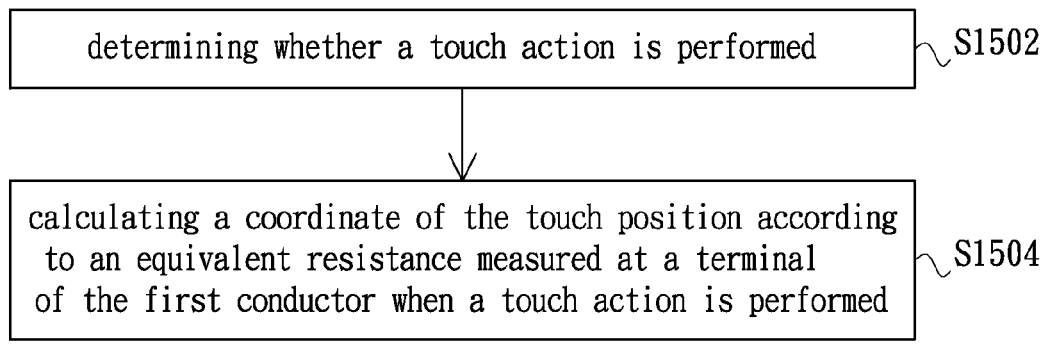
FIG. 15 is a flow chart of a touch-sensing method according to another embodiment of the present invention.

Based on the teaching of the eighth embodiment, a basic operation method can be summarized as FIG. 15. FIG. 15 is a flow chart of a touch-sensing method according to another embodiment of the present invention, which can be applied in a touch panel. The touch panel has a touch-sensing structure, and the touch-sensing structure includes a first conductor and tow touch-signal reading lines. The conductor includes N parallel conducting structures, each of which includes a first terminal and a second terminal. The first terminal and the second terminal point to a first direction and a second direction, respectively. The first terminal of the first conducting wire of the $K^{th}$ conducting structure is electrically coupled to the first terminal of the second conducting wire of the $K^{th}$ conducting structure, and the second terminal of the second conducting wire of the $K^{th}$ conducting structure is electrically coupled to the second terminal of the first conducting wire of the $(K+1)^{th}$ conducting structure, where N and K are both natural numbers, and $1 \leq K < N$.

When an external force is applied to the displaying area of the touch panel, a portion of the conductor corresponding to the position designated by the external force is electrically coupled to a reference potential, and the above two touch-signal reading lines are electrically coupled to the two terminals of the conductor, respectively. The method includes the steps of determining whether a touch action is performed (as shown in step S1502); calculating a coordinate of the touch position according to an equivalent resistance measured at a terminal of the first conductor when a touch action is performed (as shown in step S1504).

It should be noted that, from the various embodiments as described above, the touch-sensing structure provided by the present invention may also be a passive touch-sensing structure, and is extremely suitable for being applied in an embedded touch screen. In addition, the present invention can be achieved by modifying the layout of the touch panel, and thereby no extra process is needed.

In summary, the present invention utilizes a conductor and a plurality of parallel conducting wires to form a touch-sensing structure which is suitable for performing one-dimension coordinate sensing. As a resistance of each conducting wire is smaller than that of each line segment of the conductor, the resistance of each conducting wire can be ignored. Once the touch screen determines that a touch action is performed, resistances of the two equivalent resistors can be measured at two terminals of the conductor. The two measured resistances can be used to represent different numbers of line segments, and accordingly the one-dimension coordinate of the touch position can be calculated. By making use of two touch-sensing structures as described above, two-dimension coordinates of the touch position can be obtained so long as an extra process of determining the actual touch position is carried out.

Similarly, a plurality of conducting structures paralleled to each other can also be used to form a conductor, and thereby form another touch-sensing structure capable of performing two-dimension coordinates sensing in the present invention. As the farther a distance from the touch position to a terminal of the conductor, the greater the measured resistances of the equivalent resistor, once the touch screen determines that a touch action is performed, the two-dimension coordinates of the touch position can be calculated according to the resistance of the equivalent resistor measured at a terminal of the conductor.

With the above description, it can be found that the present invention mainly utilizes the above conductor to obtain the coordinates of the touch position, and the touch signal processing circuit can carry out such operation merely through being coupled to the terminals of the conductor. Thus, the touch screen using the touch-sensing structure provided in the present invention can attain high sensing resolution without employing a touch signal processing circuit having a great number of channels. Moreover, peripheral wires for the touch panel of the touch screen can be less, and thereby it is unnecessary to enlarge the width of the edge portion for the touch panel. Further, as the resistances of the two equivalent resistors can respectively be measured at the two terminals of a same conductor, so as to represent different numbers of line segments, or to calculate the distance between the touch position and the terminals of the conductors according to the resistances of the two equivalent resistors, the touch-sensing structure provided in the present invention has an ability of performing multi touch sensing, while compared with the conventional passive touch-sensing structure. In addition, compared with the conventional active touch-sensing structure, it is unneeded to employ any transistor to form the sensing unit in the touch-sensing structure provided in the present invention, and accordingly the aperture ratio of the pixel in the touch panel can be ensured, and the touch-sensing response time thereof can also be improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch-sensing structure for a touch panel display, comprising:

a plurality of photo spacers, being covered by a conductive layer coupled to a reference potential of the touch panel display;

a first conductor, being disposed on an array substrate; and a plurality of first conducting wires paralleled to each other, a terminal of each first conducting wire being electrically coupled to the first conductor, so as to divide the first conductor into a plurality of first line segments, and a resistance of each first conducting wire being smaller than that of each of the first line segments, wherein the first conducting wires are disposed on the array substrate;

wherein when a display area of the touch panel display receives an external force, one of the photo spacers would be forced to contact one of the first conducting wires, so that the first conducting wire corresponding to a position designated by the external force is electrically coupled to the reference potential of the touch panel display.

2. The touch-sensing structure of claim 1, wherein the first conductor has a plurality of continuous folds.

3. The touch-sensing structure of claim 1, wherein the first conductor comprises a first component and a second component, the first component is configured to be electrically coupled to part of the first conducting wires, and the second component is configured to be electrically coupled to rest of the first conducting wires; and the first component and the second component are separated to each other.

4. (Current amended) The touch-sensing structure of claim 1, further comprising:

a second conductor, being disposed on an array substrate; and a plurality of second conducting wires paralleled to each other, a terminal of each second conducting wire being electrically coupled to the second conductor, so as to divide the second conductor into a plurality of second line segments, and a resistance of each second conducting wire being smaller than that of each of the second line segments, wherein the second conducting wires are disposed on the array substrate;

wherein when the display area of the touch panel display receives the external force, one of the photo spacers would be forced to contact one of the second conducting wires, so that the second conducting wire corresponding to the position designated by the external force is electrically coupled to the reference potential.

5. The touch-sensing structure of claim 4, wherein the second conductor comprises a third component and a fourth component, the third component is configured to be electrically coupled to part of the second conducting wires, and the fourth component is configured to be electrically coupled to rest of the second conducting wires; and the third component and the fourth component are separated to each other.

6. The touch-sensing structure of claim 4, wherein the second conductor has a plurality of continuous folds.

7. The touch-sensing structure of claim 4, further comprising:

a third conductor parallel to the first conductor and electrically coupled to the other terminal of each first conducting wire; and a fourth conductor parallel to the second conductor and electrically coupled to the other terminal of each second conducting wire.

8. The touch-sensing structure of claim 4, wherein the first conductor and the second conductor cross to each other.

9. The touch-sensing structure of claim 1, further comprising two touch-signal reading lines electrically coupled to two terminals of the first conductor respectively.

10. A touch-sensing method for a touch panel, the touch panel utilizing the touch-sensing structure according to claim 1, the method comprising:

determining whether a touch action is performed; and calculating, when a touch action is performed, coordinates of a touch position according to resistances of two equivalent resistors respectively measured at two terminals of the first conductor.

11. The touch-sensing method of claim 10, wherein the step of calculating coordinates of the touch position comprises:

calculating a resistance of a portion of first conducting wire corresponding to the touch position according to the resistances of two equivalent resistors respectively measured at the two terminals of the first conductor, wherein the portion of the first conducting wire is from the touch position to the line segment of the first conductor; and determining the coordinates of the touch position according to the calculated resistance.

12. The touch-sensing method of claim 10, wherein when the touch-sensing structure further comprises a second conductor and a plurality of parallel second conducting wires, a terminal of each second conducting wire being electrically coupled to the second conductor so as to divide the second conductor into a plurality of second line segments, and a resistance of each second conducting wire being smaller than that of each of the second line segments, the touch-sensing method further comprises:

measuring resistances of two equivalent resistors at two terminals of the second conductor respectively;

calculating a resistance of a portion of second conducting wire corresponding to the touch position according to the resistances of two equivalent resistors respectively measured at the two terminals of the second conductor, wherein the portion of the first conducting wire is from the touch position to the line segment of the second conductor; and determining the coordinates of the touch position according to the calculated resistance.

13. The touch-sensing method of claim 12, wherein when two actual touch positions exist, further comprising: calculating two resistances from the two touch positions to two line segments of the second conductor according to a first calculation formula and a second calculation formula respectively as shown in following formulae (1) and (2):

$$R_{X1} = AR_s + \frac{R_{n1} \times (BR_s + R_{n2})}{R_{n1} + (BR_s + R_{n2})} \quad (1)$$

$$R_{X2} = CR_s + \frac{R_{n2} \times (BR_s + R_{n1})}{R_{n2} + (BR_s + R_{n1})} \quad (2)$$

where $R_{X1}$ represents a resistance of the equivalent resistor measured as a first terminal of the second conductor, $R_{X2}$ represents a resistance of the equivalent resistor measured as a second terminal of the second conductor, $R_s$ represents a resistance of each line segment of the second conductor, $R_{n1}$ represents a resistance from a first touch position of the two touch position to the line segment of the second conductor, $R_{n2}$ represents a resistance from a second touch position of the two touch position to the line segment of the second conductor, and A, B, C are natural numbers.

14. The touch-sensing method of claim 13, further comprising:
calculating two resistances from the two touch positions to two line segments of the first conductor according to a third calculation formula and a fourth calculation formula respectively as shown in following formulae (3) and (4):

$$R_{Y1} = DR_s + \frac{R_{m1} \times (ER_s + R_{m2})}{R_{m1} + (ER_s + R_{m2})} \quad (3)$$

$$R_{Y2} = FR_s + \frac{R_{m2} \times (ER_s + R_{m1})}{R_{m2} + (ER_s + R_{m1})} \quad (4)$$

where $R_{Y1}$ represents a resistance of the equivalent resistor measured as a first terminal of the first conductor, $R_{Y2}$ represents a resistance of the equivalent resistor measured as a second terminal of the first conductor, $R_s$ represents a resistance of each line segment of the first conductor, $R_{m1}$ represents a resistance from a first touch position of the two touch position to the line segment of the first conductor, $R_{m2}$ represents a resistance from a second touch position of the two touch position to the line segment of the first conductor, and D, E, F are natural numbers.

15. The touch-sensing method of claim 12, wherein when a touch action is performed, coordinates in a first dimension direction and a second dimension direction of a touch position firstly sensed are recorded, and an actual touch position is further determined from possible touch positions latterly sensed according to the recorded coordinates.

16. The touch-sensing method of claim 15, wherein one of the latterly sensed possible touch positions, which has a coordinate in the first dimension direction the same as the recorded coordinate, is removed, and another one of the latterly sensed possible touch positions, which has a coordinate in the second dimension direction the same as the recorded coordinate, is then removed, and whereby a rest one of the possible touch positions is regarded as the actual touch position.

17. The touch-sensing method of claim 15, wherein upon the condition that a pressing object slides, further comprising:
utilizing each actual touch position obtained in a first time instance is to find a touch position respectively having shortest distances thereto, from the possible touch positions obtained in a second time instance, and the found touch position being regarded as an actual touch position at the second time instance, and thereby obtaining a group of coordinates, so as to present a sliding trail of the press object according to the group of coordinates, wherein the first time instance is ahead of the second time instance.

18. A touch-sensing structure for a touch panel display, comprising:
a plurality of photo spacers, being covered by a conductive layer coupled to a reference potential;
a conductor having N conducting structures paralleled to each other, each of the conducting structures comprising a first conducting wire and a second conducting wire in parallel, each of the conducting wires comprising a first terminal and a second terminal, the first terminal of the first conducting wire of a Kth conducting structure being electrically coupled to the first terminal of the second conducting wire of the Kth conducting structure, and the second terminal of the second conducting wire of the Kth conducting structure being electrically coupled to the second terminal of the first conducting wire of a (K+1)th conducting structure, where N and K are both natural numbers, 1≤K<N, wherein the conductor and the first conducting wire and the second conducting wire are disposed on an array substrate, the first conducting wire and the second conducting wire define a line segment, and a resistance of the first conducting wire and the second conducting wire is smaller than a resistance of the line segment; and
two touch-signal reading lines configured to be electrically coupled to two ends of the conductor respectively;
wherein when a display area of the touch panel display receives an external force, one of the photo spacers would be forced to contact one of the first conducting wires, so that the first conducting wire corresponding to a position designated by the external force is electrically coupled to the reference potential of the touch panel display.

19. A touch-sensing method for a touch panel, the touch panel utilizing a touch-sensing structure according to claim 18, the method comprising:
determining whether a touch action is performed; and
calculating, when a touch action is performed, a coordinate of a touch position according to a resistance of a equivalent resistor measured at an end of the first conductor.

20. The touch-sensing method of claim 19, wherein when the touch action is performed, further comprising: calculating a coordinate of the touch position according to a resistance of another equivalent resistor measured at another end of the first conductor.

21. A touch panel display, comprising:
a plurality of photo spacers, being covered by a conductive layer coupled to a reference potential of the touch panel display;
a color filter, being disposed upon a touch-sensing structure, and the photo spacers being disposed between the color filter and the touch-sensing structure;
a first conductor, being disposed on an array substrate; and
a plurality of first conducting wires paralleled to each other, a terminal of each first conducting wire being electrically coupled to the first conductor, so as to divide the first conductor into a plurality of first line segments, and a resistance of each first conducting wire being smaller than that of each of the first line segments, wherein the first conducting wires are disposed on the array substrate;
wherein when a display area of the touch panel display receives an external force, one of the photo spacers would be forced to contact one of the first conducting wires, so that the first conducting wire corresponding to a position designated by the external force is electrically coupled to the reference potential of the touch panel display.

22. The touch panel display of claim 21, wherein the first conductor comprises a first component and a second component, the first component is configured to be electrically coupled to part of the first conducting wires, and the second component is configured to be electrically coupled to rest of the first conducting wires; and the first component and the second component are separated to each other.

23. The touch panel display of claim 21, further comprising:
a second conductor, being disposed on an array substrate; and
a plurality of second conducting wires paralleled to each other, a terminal of each second conducting wire being electrically coupled to the second conductor, so as to divide the second conductor into a plurality of second line segments, and a resistance of each second conducting wire being smaller than that of each of the second line segments, wherein the second conducting wires are disposed on the array substrate;

wherein when the display area of the touch panel display receives the external force, one of the photo spacers would be forced to contact one of the second conducting wires, so that the second conducting wire corresponding to the position designated by the external force is electrically coupled to the reference potential.

24. The touch panel display of claim 23, wherein the second conductor comprises a third component and a fourth component, the third component is configured to be electrically coupled to part of the second conducting wires, and the fourth component is configured to be electrically coupled to rest of the second conducting wires; and the third component and the fourth component are separated to each other.

25. The touch panel display of claim 23, further comprising:
- a third conductor parallel to the first conductor and electrically coupled to the other terminal of each first conducting wire; and
- a fourth conductor parallel to the second conductor and electrically coupled to the other terminal of each second conducting wire.

26. The touch panel display of claim 21, further comprising two touch-signal reading lines electrically coupled to two terminals of the first conductor respectively.

* * * * *